(12) United States Patent
Olson et al.

(10) Patent No.: US 12,469,043 B2
(45) Date of Patent: *Nov. 11, 2025

(54) DECENTRALIZED COMPUTER SYSTEMS AND METHODS FOR LOYALTY POINTS PAYMENTS USING DISTRIBUTED LEDGERS

(71) Applicant: Worldpay, LLC, Symmes Township, OH (US)

(72) Inventors: Chandra Olson, Orlando, FL (US); Joshua Mather, Bend, OR (US); Paul Anthony Rose, Pacifica, CA (US)

(73) Assignee: Worldpay, LLC, Symmes Township, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/465,318

(22) Filed: Sep. 12, 2023

(65) Prior Publication Data

US 2023/0419357 A1    Dec. 28, 2023

Related U.S. Application Data

(63) Continuation of application No. 17/656,091, filed on Mar. 23, 2022, now Pat. No. 11,798,021, which is a
(Continued)

(51) Int. Cl.
*G06Q 30/00*     (2023.01)
*G06F 16/951*    (2019.01)
(Continued)

(52) U.S. Cl.
CPC ....... *G06Q 30/0233* (2013.01); *G06F 16/951* (2019.01); *H04L 9/088* (2013.01); *H04L 9/30* (2013.01)

(58) Field of Classification Search
CPC ... G06Q 30/0233; G06F 16/951; G06F 21/64; H04L 9/30; H04L 9/088; H04L 2209/56; H04L 9/50
See application file for complete search history.

(56) References Cited

U.S. PATENT DOCUMENTS 10,796,329 B2   10/2020 Arora
11,270,299 B2    3/2022 Bankston et al.
(Continued)

FOREIGN PATENT DOCUMENTS

WO    2017136956 A1    8/2017

OTHER PUBLICATIONS

"Blockchain-based payment collection supervision system using pervasive Bitcoin digital wallet". IEEE. 2017. (Year: 2017).*
(Continued)

*Primary Examiner* — Maria V Vanderhorst
(74) *Attorney, Agent, or Firm* — Bookoff McAndrews, PLLC

(57) ABSTRACT

Decentralized computer systems and methods are disclosed for establishing and conducting payment processing with loyalty points using distributed ledger. One method includes: receiving a consumer identification, an issuer identification, and transaction information from a point of sale system when the loyalty card is presented for a transaction of a good or service at a merchant, identifying the network node containing distributed ledger associated with the issuer according to received issuer identification prompting, to participants of the shared ledger, to validate whether the consumer distributed ledger has required loyalty points for the transaction; if all of the participants of the shared ledger accepts the transaction, generating, a new immutable entry to the distributed ledger for the transaction with remaining loyalty points in the loyalty card after deducting the points required for the transaction; and sending a transaction approved message to the point of sale system at the merchant.

20 Claims, 7 Drawing Sheets

Related U.S. Application Data continuation of application No. 15/918,149, filed on Mar. 12, 2018, now Pat. No. 11,315,138.

(51) Int. Cl.
*G06Q 30/0226* (2023.01)
*G05B 19/418* (2006.01)
*H04L 9/08* (2006.01)
*H04L 9/30* (2006.01)

(56) References Cited

U.S. PATENT DOCUMENTS

| | | |
|---|---|---|
| 2012/0136780 A1 | 5/2012 | El-Awady et al. |
| 2017/0132625 A1 | 5/2017 | Kennedy |
| 2017/0161734 A1 | 6/2017 | Bankston et al. |
| 2017/0323294 A1 | 11/2017 | Rohlfing et al. |
| 2017/0357966 A1 | 12/2017 | Chandrasekhar et al. |
| 2018/0253727 A1 | 9/2018 | Ortiz et al. |
| 2019/0108542 A1 | 4/2019 | Durvasula et al. |

OTHER PUBLICATIONS

"Blockchain-based payment collection supervision system using persuasive Bitcoin digital wallet". IEEE. 2017 (Year: 2017).
"Credits and debits on the Internet". IEEE, 1997.
"Netcoin: A Traceable P2P Electronic Cash System". IEEE. 2015. (Year: 2015).
"Transforming Face-to-Face Identity Proofing into Anonymous Digital Identity Using the Bitcoin Blockchain". IEEE. 2017. (Year: 2017).

\* cited by examiner

DECENTRALIZED COMPUTER SYSTEMS AND METHODS FOR LOYALTY POINTS PAYMENTS USING DISTRIBUTED LEDGERS

CROSS-REFERENCE TO RELATED APPLICATION(S)

This patent application is a continuation of and claims the benefit of priority to U.S. application Ser. No. 17/656,091, filed on Mar. 23, 2022, which is a continuation of and claims the benefit of priority to U.S. application Ser. No. 15/918, 149, filed on Mar. 12, 2018, now U.S. Pat. No. 11,315,138, the entireties of which are incorporated herein by reference.

FIELD OF DISCLOSURE

The present disclosure relates generally to the field of electronic payment transactions, and more particularly to, systems and methods for loyalty points payment using distributed ledgers.

BACKGROUND

Merchants often issue loyalty card(s) as a way to incentivize and track use of their merchandise and/or services. Typically, a merchant may allot loyalty points to a customer when the customer uses a loyalty card to make purchase of goods or services from the merchant or the affiliates of the merchant. Airlines, hotels, car rental companies, chain retailers, telecom providers, casinos, etc., may have historically introduced frequent use programs that may offer awards of loyalty points or other such incentives schemes based on the purchases made by customers, in order to attract and retain their customers.

In a typical scenario, a consumer can redeem the loyalty points at the specific merchant (e.g., who issued the loyalty card) via a closed loop system. Merchants may use standalone devices where the customers can present (e.g., tap or swipe) their loyalty cards to make purchases with the loyalty points, where the payment vehicles for the loyalty points ("loyalty cards") may be physical cards and/or a digital card linked to a credential, such as a phone number. However, in a traditional setting, each merchant may issue its specific loyalty card, which may overwhelm consumers with carrying a physical loyalty card for each merchant. As a result, the consumer may forget to use the loyalty points when the consumer shops at the specific merchant. For this reason, the consumer may become discouraged from signing up for a loyalty card membership. Nevertheless, merchants would like to incentivize a consumer's behavior by providing loyalty points to patrons, and would also like to keep track of their consumers' loyalty points online.

To encourage users to sign up for loyalty cards, there is a desire for a loyalty points payment system that may allow consumers or patrons to earn loyalty points from online and in person activities (e.g. shopping for goods or services, playing games at casinos, etc.) at one or more merchants and redeem their loyalty card points in a seamless manner at the merchants both in and outside of the network of the issuer of the loyalty card using existing Point of Sale (POS) solutions (e.g., in an open-loop scenario). Additionally, there is a need to guarantee merchants that they will be paid in actual currency when accepting loyalty points.

In addition, in an environment where various merchants may not be members of the same network as entities providing, for example, loyalty points, there is a desire for a system and method that may act as an intermediary between these networks.

The present disclosure is directed to overcoming one or more of these above-referenced challenges.

SUMMARY

According to certain aspects of the present disclosure, systems and methods are disclosed for enabling efficient electronic payment transactions with loyalty points using distributed ledgers.

In one embodiment, a computer-implemented method is disclosed for establishing a loyalty card payment system using distributed ledgers across an intermediary payment network. The method comprises: issuing a loyalty card to a consumer who signs up for a loyalty program, adding loyalty points to the loyalty card; generating an entry to a network node of a distributed ledger (e.g., blockchain), wherein the entry may include loyalty points and terms and conditions associated with the loyalty points; and reporting loyalty points to a shared ledger. The consumer earns loyalty points by purchasing goods or services provided by an issuer, interacting with promotional campaigns from the issuers, transferring funds from a financial institution to the loyalty card, and transferring points from another consumer's account.

In one embodiment, a computer-implemented method is disclosed for conducting payment processing with loyalty points using distributed ledgers across an intermediary payment network. The method comprises: retrieving a consumer identification and an issuer identification from the loyalty card presented for a transaction of a good or service at a merchant point of sale system online or instore; sending the consumer identification, the issuer identification, and transaction information to an acquirer; identifying the network node containing the distributed ledger ((e.g., blockchain) associated with the issuer according to received issuer identification; converting the transaction dollar amount to loyalty points according to a conversion formula in the entry in the or the distributed ledger (e.g., blockchain) entry; prompting, to participants of the distributed ledger (e.g., blockchain), to validate whether the consumer has required loyalty points for the transaction; if all of the participants of the blockchain network (or the distributed ledger) accepts the transaction, generating a new immutable entry to the distributed ledger for the transaction with remaining loyalty points in the loyalty card after deducting the points required for the transaction; and sending a transaction approved message to the point of sale system at the merchant.

In one embodiment, a decentralized computer system is disclosed for conducting payment processing with loyalty points using distributed ledgers across an intermediary payment network. The system comprising: a data storage device storing instructions using distributed ledger; and an acquirer processor configured to execute the instructions to perform a method including: receiving a consumer identification, an issuer identification, and transaction information from a point of sale system when the loyalty card is presented for a transaction of a good or service at a merchant, wherein the transaction is at least one of online and in-store purchase of the good or service; identifying the network node containing distributed ledger associated with the issuer according to received issuer identification; prompting, to participants of the shared ledger, to validate whether the consumer distributed ledger has required loyalty points for the transaction; if all of the participants of the shared ledger accepts the transaction, generating, a new immutable entry to the distributed ledger for the transaction with remaining loyalty points in the loyalty card after deducting the points required for the transaction; and sending a transaction approved message to the point of sale system at the merchant.

In some embodiments, the non-transitory machine readable medium may be embedded into various nodes of the distributed ledger.

Additional objects and advantages of the disclosed embodiments will be set forth in part in the description that follows, and in part will be apparent from the description, or may be learned by practice of the disclosed embodiments. The objects and advantages on the disclosed embodiments will be realized and attained by means of the elements and combinations particularly pointed out in the appended claims.

It is to be understood that both the foregoing general description and the following detailed description are exemplary and explanatory only and are not restrictive of the detailed embodiments, as claimed.

DETAILED DESCRIPTION

Figure 1:
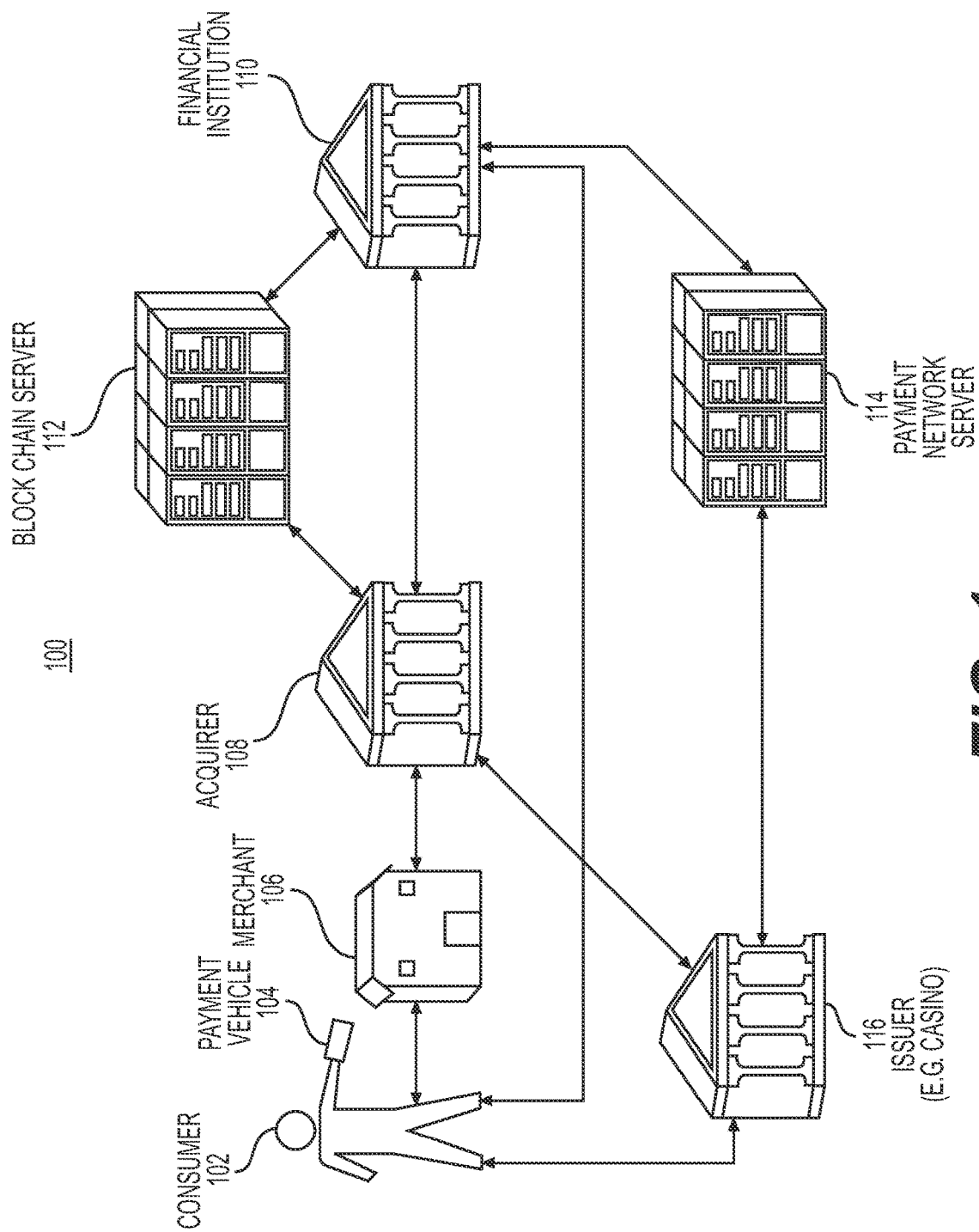
FIG. 1 depicts a loyalty points payment system for payment transactions using distributed ledgers across an intermediary payment network, in accordance with non-limiting embodiments.

Various non-limiting embodiments of the present disclosure will now be described to provide an overall understanding of the principles of the structure, function, and use of systems and methods disclosed herein for establishing a loyalty points payment system using distributed ledger.

As described above, existing methods of loyalty points payment processing are complicated, lengthy, and cumbersome for issuers, consumers, merchants, and/or acquirers. Consumers may have to carry multiple cards for one or more merchants and remember to use loyalty points while purchasing at the specific merchant. Merchants may additionally have to issue and manage multiple types of loyalty points to consumers.

Thus, the embodiments of the present disclosure are directed to a system and method for enabling merchants and consumers to manage and use loyalty points in an efficient, transparent, and standardized method, reducing costs for parties, and minimizing risks. In various embodiments, a "blockchain" may refer to any open, shared or distributed ledger (e.g., "shared permissioned ledger,") that can record transactions between parties to a payment transaction efficiently and in a verifiable and permanent way (e.g., by providing visibility or by being transparent to various participants of the blockchain or its distributed ledger). A blockchain or its distributed ledger may be operated by many different parties that come to any shared consensus. It may maintain a growing list of ordered records, called blocks. Each block may have a timestamp and a link to a previous block. Records may be prevented from being altered retroactively. A common analogy for a blockchain or its distributed ledger may be a digital network of safety deposit boxes. These boxes can secure any digital asset (e.g., currency, securities, loyalty points, contracts). Each box may be locked with a crypto private key. The owner of the box can use their key to unlock the box and push a digital asset to another safety deposit box that is secured by the keys of the recipient. The recipient can then retrieve the digital asset from their safety deposit box.

A blockhain network or its distributed ledger may include one or more of the following features. In some embodiments, a blockchain or its distributed ledger may include a database, and tabular schemes may be used to encode core data types on top of a traditional database. In such embodiments, tables may consist of blocks, which may be bundles of transactions. Furthermore, such embodiments may be configured so that distributed ledger transactions may be "all or nothing." A distributed ledger may be rendered immutable, ensuring that the data stored cannot be changed. Each block in the chain may include a reference to the previous block so that in chains with a high rate of new transactions, the block may become securely linked to previous blocks. The block may also be replicated numerous times. Cryptography may ensure that users of a blockchain network or its distributed ledger may only edit the parts of the distributed ledger that they "own" by possessing the private keys necessary to write to the file. Cryptography may also ensure that copies of the distributed ledger are kept in sync. Distributed ledgers ("shared ledgers") may be used for transaction integrity. Thus, ledgers may be maintained by multiple independent entities on different computing devices. A consensus protocol may be followed by each entity to maintain a consistent view of the ledger. Distributed ledgers provide for greater resiliency against malicious attacks or system failures. Furthermore, a distributed ledger may be "permissioned"—e.g., allow access to only a specific set of participants. It is contemplated that it may be useful for financial applications to use distributed, centralized, permissioned, tokenless ledgers as a basis for the implementations of various systems and methods presented herein.

Blockchain(s) and/or their distributed ledger(s) may have a long-term impact on the financial services industry in paring down transaction settlement time from days to minutes and minimizing the need for intermediaries. Furthermore, it may enable point-to-point exchanges of digital assets without a need for trust between the parties in the exchange. This may eliminate the need for third party engagement in transactions and may reduce the costs involved in verifying a transaction.

As applied to at least some embodiments presented therein, a blockchain having a shared permissioned ledger may be available to participants and may provide visibility to the participants of the blockchain or its distributed ledger, which may be the parties of a payment transaction initiated by a consumer and originating at a merchant. These parties may include, but are not limited to, the consumer, the merchant at which the transaction originates, the merchant's acquiring bank or institution, and the issuing institution or bank of the consumer. A blockchain process, e.g., as described by various embodiments of the present disclosure, may facilitate a transparent, rules-based, communication process to reduce costs for both merchants and acquirer.

The types of blockchain systems used for payment transactions may include, for example, public blockchains, private blockchains, or a hybrid form of a public and private blockchain (e.g., a consortium blockchain or hyperledger blockchain). In a consortium blockchain, the consortium may include and may be accessible to the participants of the blockchain or its distributed ledger (e.g., consumers, issuers, merchants, and/or acquirers of a payment transaction). A consortium blockchain may proffer the benefits of setting control of the rules for payment transaction using loyalty points within the bounds as agreed upon by the participants. Thus, the rights to read and/or access the blockchain or its distributed ledger may be restricted to different participants, based on individual classes or identities of the participants.

In some embodiments, the participants of a blockchain or its distributed ledger, prior to joining the blockchain's network, may be vetted, and hence may not be anonymous participants. Vetting may minimize the risk of any form of malicious attacks on the distributed ledger. In other embodiments, the new entrants to a blockchain or its distributed ledger may be restricted to those known by other known participants of the blockchain or its distributed ledger. These blockchains or their distributed ledgers (e.g., a consortium blockchain or its shared ledger) may eliminate and/or significantly reduce the risks of attacks that are prevalent, for example, in public blockchains (e.g., 51% attack). The risks may be eliminated and/or significantly reduced due to restrictions placed on the entry of new members. The transactions may resemble the "colored pin" approach of transferring ownership to different participants in the blockchain or its distributed ledger. It may also be efficient to use certain blockchains or their distributed ledgers (e.g., consortium blockchains or their distributed ledgers) due to the limited number of nodes that may need to be updated and the limited role of verifying the blocks before those are appended to the blockchain or its distributed ledger.

The members or participants of the blockchain or its distributed ledger may be represented as nodes of the blockchain or blockchain network. In some embodiments, for example, where the nodes may be "trusted" and/or be well connected, a distributed ledger may enable the nodes to easily spot and/or fix any failures or inconsistencies of the blockchain or its distributed ledger. For example, in a consortium blockchain or its distributed ledger, payment transactions may be many degrees cheaper compared to their implementation on a public blockchain or its distributed ledger. Additionally or alternatively, a blockchain or its distributed ledger may be used that may provide flexibility to develop on the blockchain or distributed ledger infrastructure. For example, a Hyper-ledger may be specifically built to expand to other non-traditional use-cases of the blockchain. Since verification may be needed by a comparatively larger number of nodes in the public blockchain or its distributed ledger as compared to a consortium or private blockchain or its distributed ledger, a public blockchain or its distributed ledger may require a high level of computational power than a consortium or private blockchain or its distributed ledger.

In some embodiments, the blockchain or its distributed ledger loyalty points payment process may involve a Smart Contracts application. In various embodiments, "Smart Contracts" may refer to a computerized transaction protocol that facilitates, verifies, and/or enforces the negotiation or performance of a contract (e.g., as the one governing a payment transaction using loyalty points). A Smart Contract may satisfy common contractual conditions (e.g., payment terms, liens, confidentiality, enforcement, etc.), minimize malicious and/or accidental exceptions, and/or minimize the need for trusted intermediaries. Different types of algorithms may be employed to offer finality (e.g., of a contract) in a shorter timeframe. Various rules for initiating or managing the loyalty points and payment settlements between parties can be "codified" into the smart contract between the participants. In some embodiments, once the rules have been "codified" into the blockchain or its distributed ledger, the rules of the Smart Contracts may be rendered or configured to be final and/or immutable during its execution of the Smart Contract.

For example, the distributed ledger loyalty points payment process may be governed and/or at least initialized using Smart Contracts. Participants of the loyalty points payment process (e.g., consumers, issuers, merchants, acquirers, etc.) may establish the underlying attributes of the contract governing the payment transaction, or the underlying rules of the loyalty points payment process. Smart Contracts may then proceed to execute the payment transaction based on the underlying attribute values or facilitate the loyalty points payment process using the underlying rules.

In some embodiments, cryptographic assurances may be available to the participants. Documents may be captured and securely stored by the blockchain or its distributed ledger, for example, in an off-the-blockchain storage (e.g. NoSQL database), for retrieval by the other party. Identifiers to these documents may be stored in the blockchain or its distributed ledger. These documents may include, for example, receipts of purchases, identification information of the consumer, merchant, issuer, or acquirer, available funds or resources, geographical information, or temporal information.

One or more examples of these non-limiting embodiments are illustrated in the selected examples disclosed and described in detail with reference made to FIGS. 1-7 in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

FIG. 1 depicts an illustration of the environment for the distributed ledger loyalty points payment system 100, in accordance with non-limiting embodiments. At a high level, the environment for the distributed ledger loyalty points payment system 100 comprises: a consumer 102 equipped with a payment vehicle 104 from an "issuer" 116; a merchant 106 with an acquiring bank or institution, e.g., "acquirer" 108; a management server or computing system for a blockchain or its distributed ledger 112 (or "blockchain server"); and a computing system or payment network server 114 for a payment (e.g., debit or credit) network used in the transaction. In various embodiments of the present disclosure, the acquirer 108 and the financial institution 110 may also refer to the computing system or server of the acquirer 108 or financial institution 110, respectively.

Various embodiments of the present disclosure may involve the consumer 102 conducting a payment transaction with merchant 106 using a payment vehicle 104, e.g., a credit card with loyalty points, casino loyalty card, etc. It will be appreciated by those of skill in the art that consumer 102 may present payment vehicle 104 at a POS terminal of merchant 106 to initiate a payment transaction. However, in some embodiments, there may be an online portal of a merchant for the consumer to initiate a payment transaction in lieu of a physical POS terminal. Upon initiation of the payment transaction by a consumer, the merchant and/or the POS terminal of the merchant may transmit transaction information to the acquirer 108 of the merchant. The transaction information may include, for example, information identifying the issuer 116 of the payment vehicle 104 of the consumer 102. The transaction information may be encrypted and entered into a distributed ledger where the members of a shared ledgers (e.g., nodes) may be able to read and/or access each block of the blockchain or its distributed ledger.

Figure 2:
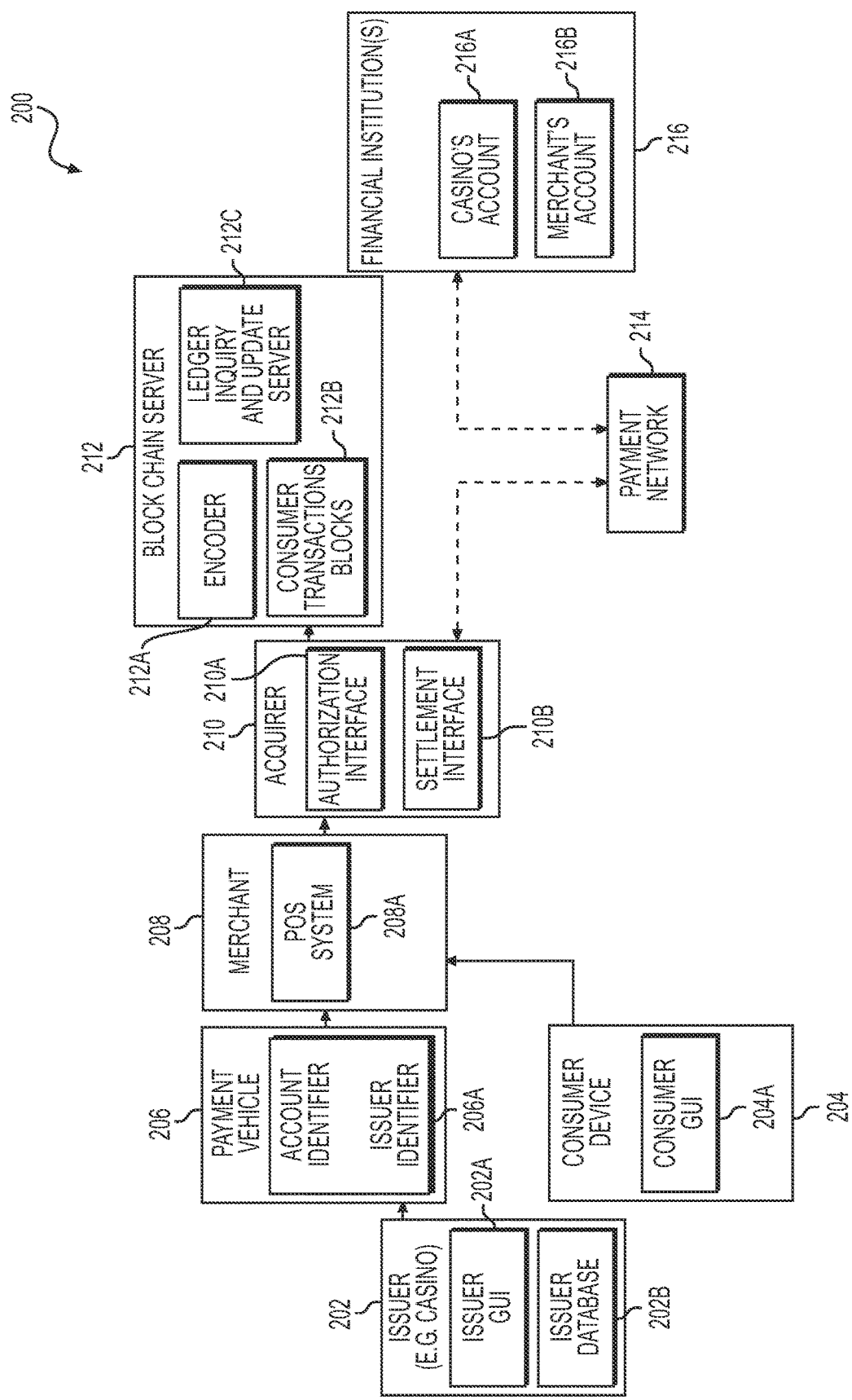
FIG. 2 depicts a detailed schematic of components of the blockchain loyalty points payment system, in accordance with non-limiting embodiments.

FIG. 2 depicts a block diagram of an example of the distributed ledger loyalty points payment system of FIG. 1 for payment transactions, in accordance with non-limiting embodiments. Specifically, the network comprises the issuer 202, the payment vehicle 206 of a consumer, a consumer device 204 of a consumer, the merchant 208, the acquirer 210, a distributed ledger "blockchain server," 212 that manages loyalty points payment transactions, the payment network server 214, and the financial institution(s) 216.

The payment vehicle 206 may be linked with a loyalty points account of resources or funds defined by an account identifier (e.g., "primary account number (PAN)") and issuer identifier 206A. In one embodiment, the PAN may identify one or more payment source accounts of the consumer, issued or established by a given issuer 202. Unless otherwise specified herein, a payment vehicle 206 may include a physical card including a plastic or metallic card having a magnetic stripe, bar code, or other device or indicia indicative of an account number or other account information, and/or a virtual card, such as a display or screen shot for a mobile phone or for another portable device (e.g., a flash drive, smart chip, a laptop or portable computer), or for a computer device (e.g., a desktop computer) in combination with data indicative of an account number or other account indicative information. It is also contemplated that the payment vehicle 206 may have multiple embodiments or forms. For example, payment vehicle 206 can be a physical card (e.g., in the form of magnetic striped plastic card), a virtual card (e.g., in the form of a display on a smart phone), or both. The virtual card may be communicated by displaying a display or screen shot, and/or by transmitting a signal, such as by using NFC (Near Field Communication) technology or other secure transport technologies to complete the transaction with the selected merchants. Optionally, the virtual card may have a display element (e.g., a bar code or string of numbers) which identifies the account number (e.g., PAN) associated with the card. Alternatively, the virtual card may have display elements relating to the merchants that accept the card.

A consumer, sometimes referred to as the end user, a cardholder, or a card member, may provide identifying information, e.g., via the PAN of the user, to the POS system 208A of the merchant 208 to initiate a transaction with merchant 208 using the consumer's payment vehicle 206. In some cases, the consumer may use a computing device or mobile device ("consumer device" 204) to initiate the transaction, such as for a card-not-present transaction at an online merchant. Thus, payment vehicle 206 may enable the consumer to initiate a transaction with merchant 208 using the payment source associated with the issuer 202 that issued the payment vehicle 206 to the consumer. A consumer may also use the consumer device 204 to oversee, manage, or access details regarding a payment transaction via user interface, such as consumer GUI 204A.

In various embodiments described herein, a merchant 208 may refer generally to any type of retailer, service provider, or any other type of business that is in networked communication with the computing system of an acquiring institution or bank ("acquirer" 210) and uses the payment processing services of acquirer 210. Payment processing services may include receiving and responding to authorization requests as well as facilitating the settlement of funds associated with card-based transactions occurring at merchant 208. In some embodiments, as described herein, the acquirer 210 may use the blockchain server 212 to facilitate the settlement of funds associated with the card-based transactions occurring at merchant 208. A merchant 208 may have one or more POS systems 206A. In various embodiments described herein, a POS system 206A may refer broadly to include POS systems at brick and mortar locations and "virtual" POS systems that can be associated with online retailers or "in-app" purchases. In some cases, a POS system 208A may include a physical terminal, or other network computing system used to facilitate a payment transaction at a location of merchant 208. Each POS system 208A may be generally unmodified or "stock" and simply facilitate the standard transmission of transaction-related information to the acquirer computing system 210, as is known in the art. The transaction-related information may include, but is not limited to, a transaction authorization request ("authorization request"), including but not limited to, a payment amount, loyalty points amount, a date, a time, an account identifier, as well as other types of identifying indicia (e.g., merchant identification). The identifying indicia may vary based on POS system 208A, the type of merchant, and the type of transaction, but example types of identifying indicia may include any of the following: an alternative identifier to the account identifier of the user; a user's name or other user identifier; a merchant identification (MID) identifier; a merchant category code (MCC) identifier; a media access control (MAC) identifier; an internet protocol (IP) identifier; a geographic identifier; and/or a payment type identifier.

Referring now to acquirer computing system 210, authorization interface 210A may receive a transaction authorization request from POS system 208A of merchant 208. The authorization request may comprise various data, including, for example, a MID, a MCC, the cardholder's account identifier 206A, and a transaction amount, among other things. In some embodiments, acquirer computing system 210 may also receive other consumer-identification related data, e.g., an email address, an IP address, etc. In yet another embodiment, the transaction authorization request detail may contain identifying information about the merchant. Once the authorization request is received, acquirer 210 may transmit the transaction authorization request, including the amount of funds required for the transaction ("transaction amount") and the account identifier (or issuer identifier) 206A of the user, received from POS system 208A, to payment network 214 for further processing of the payment transaction. In some embodiments, a component of acquirer computing system 210 (e.g., authorization interface 210A) may also transmit data identifying the acquirer to payment network 214. Still referring to FIG. 2, once the transaction authorization request is delivered to the acquirer 210, the acquirer may further query the blockchain server 212 to further process the transaction. For example, the acquirer may query one or more shared ledger participants about approval of the transaction.

In various embodiments described herein, an issuer 202 may refer to an institution or organization that issues a payment vehicle 206 to the consumer or to the computing system of the institution or organization. The issuer 202 may enable the consumer to use funds from a payment source held by the issuer (e.g. loyalty points). For example, the issuer 202 may be a merchant (e.g. casino) that gives out loyalty points to the consumer. In one embodiment, at least some of the consumer data as it pertains to a payment transaction may be stored in a distributed ledger of a blockchain, where the participants of the blockchain network include the parties involved in the payment transaction (e.g., consumer, merchant, issuer, acquirer, etc.). In some embodiments, the transaction authorization request made by the acquirer 210 may itself be a block in a distributed ledger of the blockchain, accessible to the issuer (and other participants of the blockchain or its distributed ledger) on the shared ledger.

Once the shared ledger approves the transaction, the acquirer may send request to the identified blockchain (or its distributed ledger) to withdraw the points. Once loyalty points are withdrawn, a new entry may be published in the distributed ledger so that participants of the blockchain network or its distributed ledger (e.g., merchant, acquirer, consumer, issuer, etc.) may be informed. The blockchain server 212 may oversee the loyalty points transaction process when one or more participants of the blockchain or its distributed ledger an attribute of the payment transaction ("transaction information") posted on the shared ledger. The attributes may include, but are not limited to: the identity of the merchant, consumer, acquirer, or issuer of the payment transaction; the transaction amount; an itemization and description of the goods and/or services transacted for; any geographical and/or temporal information of the payment transaction; any taxes, any tips, any discounts; any fees directed towards acquirers, issuers, payment networks; currency exchange rates; etc. In some embodiments, any data for an attribute of the transaction information posted to a blockchain or its distributed ledger may be encrypted using encoder 212A, for example, to provide security and/or protect sensitive information. Data stored for these attributes may be quantitative (e.g., an amount) and/or qualitative (e.g., name of merchant). In some embodiments, metadata may also be stored. A ledger inquiry and update interface 212C may be one or more of an application, application program interface, software, hardware, server, or protocol that allows the addition of data (e.g., a new attribute or a detail regarding an attribute for the payment transaction) to a blockchain and/or its distributed ledger. In some embodiments, ledger inquiry and update interface 212C may further enable the access or retrieval of data for any attribute of the transaction information from the shared ledger.

Figure 3:
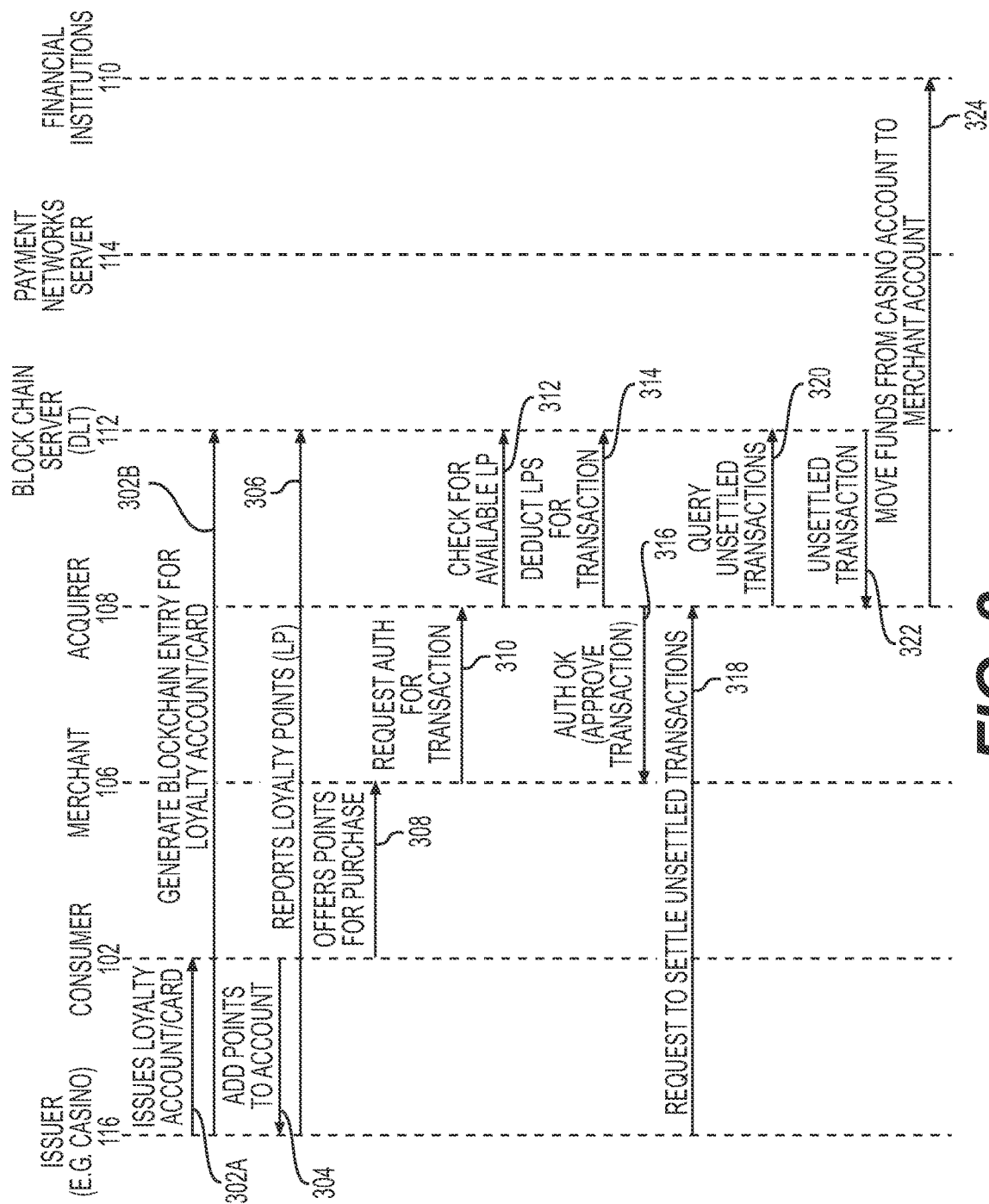
FIG. 3 depicts a simplified sequence flow diagram of a method for efficient loyalty points payment system of FIG. 1 using distributed ledgers (e.g., blockchain network(s)) across an intermediary payment network, in accordance with non-limiting embodiments.

FIG. 3 depicts a simplified sequence flow diagram of method for establishing loyalty points payment system using distributed ledgers, in accordance with one non-limiting embodiment. In an example embodiment, the method may be executed by the processors, devices, and/or components related to the consumer 102, the issuer 116, the distributed ledger loyalty points payment system ("blockchain server") 112, the payment network server 114, the acquirer 108, and the merchant 106.

In process flow 302, issuer 116 may issue a loyalty card to consumer 102. For example, issuer 116 may be a casino which issues a loyalty card to a consumer allowing the consumer to play games at the casino or purchase items with the issued loyalty cards. In process flow 304, issuer 116 or a consumer 102 may send a request to add points to the loyalty card associated with the consumer 102 to acquirer 108. The process of adding points to the loyalty card may include causing acquirer 108 to receive, over a wired or wireless network, a request to add loyalty points to the loyalty card by at least one of consumer 102 or issuer 116, wherein the request includes at least one of a consumer's account identification, an account identification, an issuer identification, and a number of points to be added to the loyalty card. The acquirer 108 identifies a network node maintaining a blockchain or its distributed ledger associated with issuer 116 according to the received issuer identification and the account identification.

The acquirer 108 may prompt participants of a distributed ledger to validate whether loyalty points can be added to the identified account. Additionally, if all of the participants of the distributed ledger accept the request, acquirer 108 may generate a new immutable entry to the distributed ledger associated with issuer 116. The generated distributed ledger entry may include at least one of a public key identifying the consumer, a unique private key, total sum of loyalty points after adding requested after adding requested loyalty points, and terms and condition associated with the points. The acquirer 108 may send an approval message to the point of sale system at merchant 106 once the distributed ledger node approves the transaction.

In an above example embodiment, the consumer may add loyalty points to the loyalty card by at least one of earning loyalty points by purchasing goods or services provided by issuer 116, transferring funds from one or more financial institutions 110 to the loyalty card, and transferring points from another account. In accordance with the above embodiment, the terms and condition associated with the account are at least one of spending limits on the account, marking points as spendable with specific merchants, and rules and regulations accordingly to the policies of the issuer 116. At process flow 306, issuer 116 may report the loyalty points (LP) associated with loyalty points card of consumer 102 to blockchain server 112. In yet another embodiment, the terms and condition associated with the points may be at least one or more spending limits on a consumer's account, marking points as spendable with specific merchants, and rules and regulations accordingly to policies of issuer 116.

In an example embodiment, as described in operation 318, issuer 116 may request to settle pending transactions to acquirer 108. The request may include at least one of an issuer's account information and routing information associated with a financial institution. In another embodiment, acquirer 108 may query blockchain server 112 for any one or more unsettled transactions, as per operation 320. In the above example embodiment, the acquirer may receive a list of unsettled transactions from blockchain server 112 in operation 322.

Once the pending transactions are identified in operation 320, the acquirer may determine a payment amount to be transferred for settlement between issuer 116 and merchant 106 using conversion information available on at least one blockchain entry associated with the at least one pending transaction(s). In the above embodiment, in operation 324, acquirer 108 may further send a request to one or more financial institutions 110 to transfer the determined payment amount from an issuer's account to a merchant's account using a standard payment process for the at least one pending transaction(s) using payment networks server 114.

In operation 308, the consumer may offer points (e.g., via a loyalty card) for purchase at a point of sale of merchant 106. In operation 310, the point of sale of merchant 106 may send an authorization request to acquirer 108. The acquirer 108 may receive a consumer's account identification, an issuer identification, and transaction information for a transaction from a point of sale system as part of a request for authorization for transaction at process 310. The transaction in process 310 may be at least one of an online and/or in-store purchase of good(s) or service(s).

The acquirer processor 108 may identify a network node maintaining a blockchain or its distributed ledger associated with the issuer and/or a consumer, according to received issuer and consumer's account identification. An issuer may have its own distributed ledger or have a node on a shared distributed ledger. For example, an issuer can be a network participant and as such can maintain its own node and/or utilize the existing network for identification. For example, acquirer 108 may convert a transaction dollar amount to loyalty points according to a conversion formula in the identified consumer distributed ledger entry. The conversion formula could be done using a smart contract that maintains a list of agreed conversion rates between different points and currencies. At operation 312, acquirer 108 may prompt participants of a shared ledger (e.g., 212C of blockchain server 112) to validate whether the consumer has the requisite loyalty points for the transaction. This may involve looking up the consumer's blockchain entry and/or distributed ledger entry to compare the requisite loyalty points with the consumer's available loyalty points. In an example embodiment, the distributed ledger entry may be accessible by at least one of the participants of the shared ledger and acquirer 108. The at least one participant of the shared ledger may maintain different blockchain(s) or its distributed ledger (s) on a network node maintained by a different issuer participating in a loyalty program. In an example embodiment, the distributed ledger entry may comprise one or more of a unique identifier of the consumer, a header, conversion information between points and currency (e.g., rate at time of conversion), a contractual formula for conversion, transaction information, and/or content data.

In one embodiment, acquirer 108 may generate a new immutable entry to the blockchain or its distributed ledger for the transaction with remaining loyalty points in the loyalty card after deducting the loyalty points required for the transaction if all of the participants of the shared ledger accept the transaction. The acquirer 108 may send a transaction approval message to point of sale system at merchant 106 once the transaction is approved. In some embodiments, acquirer 108 and/or the distributed ledger loyalty points payment system may encrypt the transaction information using, e.g., an encoder. The encryption may protect sensitive information of the consumer or merchant, and/or restrict the accessibility of the information. The attributes of the payment transaction may include, but are not limited to, e.g., an identification of the merchant, an identification of the consumer, the transaction amount, an itemization of the goods and/or services transacted for, geographical and/or temporal information of the transaction, any taxes, any tips, any discounts; any fees directed towards acquirers, issuers, payment networks; etc.

In some embodiment, the acquirer 108 may receive a rejection message from the blockchain server 212 (e.g., ledger inquiry and update server 212C) if the consumer 102 does not have required loyalty points for the transaction. The acquirer 108 may send the rejection message to the point of sale system of merchant 106. In an alternative embodiment, upon determining that consumer 102 does not have required loyalty points for the transaction, acquirer 108 may further send available dollar amount in the loyalty card to point of system of merchant 106. The point of system may present consumer 102 the dollar amount available in the loyalty card on an interactive graphical user interface (GUI). The acquirer 108 may further provide the point of sale system at merchant 106 an option to choose partial payment using available loyalty points. The point of sale at merchant 106 may be a participant of loyalty program or issuer 116 of the loyalty card. In an alternative embodiment, merchant 106 may not be part of loyalty program nor the issuer 116 of the loyalty card.

The acquirer 108 may update the loyalty points associated with the consumer's account identification in an issuer database 202B upon the approval of the transaction from the shared ledger. Additionally, the loyalty points at issuer database 202B may be accessed by at least one of consumer 102 and issuer 116 using interactive graphical user interface (GUI). In an example embodiment, acquirer 108 may be an observer of the blockchain and/or a participant of its distributed ledger.

In some embodiments, ledger inquiry and update interface 212C may enable the access or retrieval of information from the shared ledger. Thus, the ledger inquiry and update interface may respond to requests to add attributes of loyalty points payment transaction and/or search for or retrieve details regarding a transaction attribute. The ledgers and/or sub-ledgers of the distributed ledger loyalty points payment system may be continually updated, and may be updated to reflect accurate details regarding the payment transaction between participants of the distributed ledger. The ledger may be updated and/or new details may be posted by adding blocks to the blockchain or its distributed ledger using pre-defined rules, e.g., agreed on by the participants of the blockchain or its distributed ledger. In other embodiments, the ledger may be updated and/or new details may be posted, using block chain mining methods known to persons having skill in the art.

Figure 4:
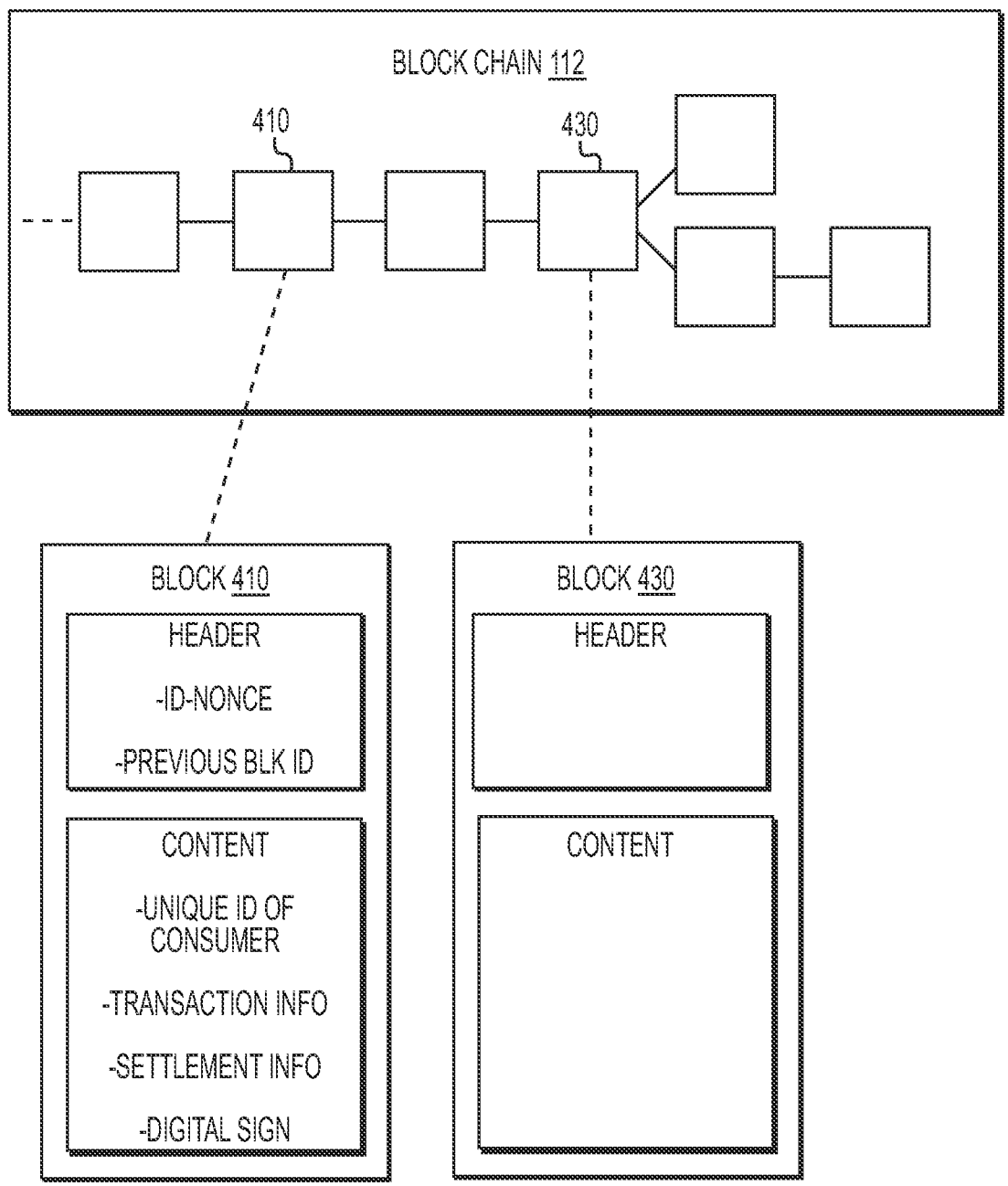
FIG. 4 is an exemplary structure of a distributed ledger (e.g., blockchain)) entry according to one or more non-limiting embodiments.

FIG. 4 is an exemplary structure of a blockchain (or distributed ledger) entry, according to one or more non-limiting embodiments. In one embodiment, distributed ledger structure may comprise one or more block entries (e.g., 410 and 430). A blockchain entry 410 structure may comprise a header and content portion, as shown in FIG. 4. The header may include unique blockchain entry ID and Nonce. The "nonce" in a bitcoin block may be a 32-bit (4-byte) field whose value is set so that the hash of the block will contain a run of leading zeros. Nonce may be a random arbitrary number that is only used once. The blockchain header may also contain previous block entry identification. The second portion of the blockchain entry's content may include information, such as consumer identification, transaction detail, points dollar conversion chart, digital signature of the consumer, merchant identification, etc.

Figure 5:
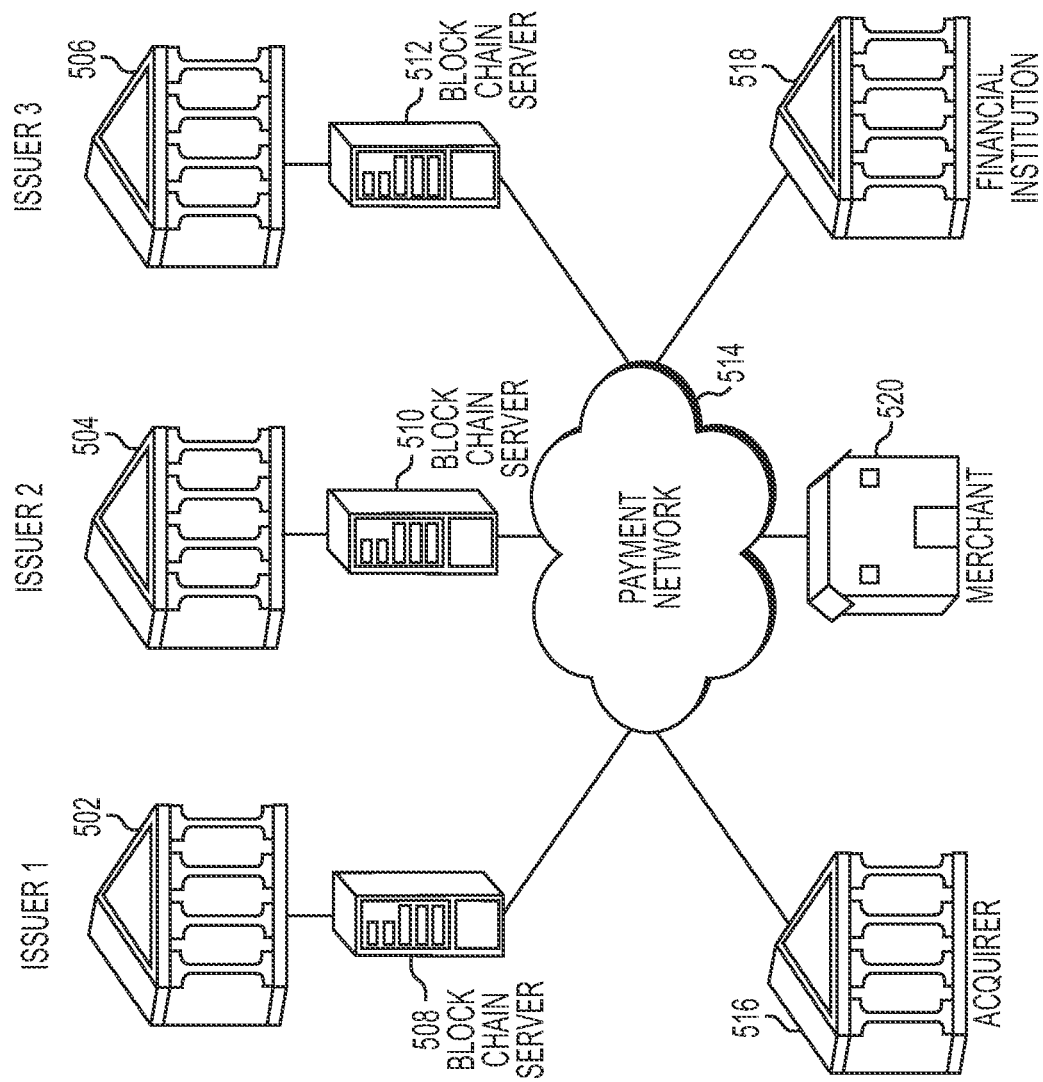
FIG. 5 depicts a distributed ledger loyalty points payment system involving multiple distributed ledgers for payment transactions using loyalty points.

FIG. 5 depicts block-diagram showing loyalty points payment system involving multiple issuers. In an example embodiment, issuer 1 (502) may be a merchant selling goods, issuer 2 (504) may be a casino providing gaming machines and services, and issuer 3 (506) may be a merchant selling services. The issuers 502, 504, and 506 may issue separate loyalty points memberships to one or more consumers or patrons. The issuers 502, 504, and 506 may mine their own blockchain servers and act as shared ledger to approve and verify transactions involving loyalty points. For example, payment transaction involving loyalty points issued by issuer 2 (504) may be approved by issuer 1 (502) and issuer 3 (506).

In one embodiment, the issuers (502, 504, and 506) may be part of loyalty points payment system using blockchain or their distributed ledgers and issue a loyalty card that is compatible with issuers participating in the distributed ledger payment program. In some embodiments, consumer or patron may play games at the casino using the loyalty card and earn points. The acquirer 516 may request a new distributed ledger entry to blockchain server 510 after inquiring with block chain servers 508 and 512. Similarly, the patron may use the loyalty points at the casino after inquiring transaction with shared ledger (e.g., 508 and 512).

In another embodiment, the consumer or card member may use the loyalty card at merchant 520, where the acquirer may act as an observer that queries the blockchain servers 508, 510, and 512 for transaction approval and converts the purchase amount into points according to conversion formula provided by the entry to the blockchain or its distributed ledger. These arrangements may enable the patron to use the loyalty points earned from casinos to a merchant 520 for payment transactions in an efficient and secure manner without requiring the merchant 520 to be aware of available loyalty points or loyalty points conversion. The merchant 520 may get paid the transaction amount from the casino's account at financial institution 518 during settlement process triggered by the acquirer 516.

In various embodiments of the present disclosure, attributes of the payment transaction may refer to, for example, details related to a payment transactions (e.g., an identification of the merchant, an identification of the consumer, the transaction amount, an itemization of the goods and/or services transacted for, geographical and/or temporal information of the transaction, any taxes, any tips, any discounts; any fees directed towards acquirers, issuers, payment networks; currency exchange rates; etc.). In such embodiments, the results and/or process of the transaction(s) may be published in the distributed ledger, which may be readily available to the participants of the blockchain or its distributed ledger (e.g., issuer, acquirer, consumer, merchant, etc.).

Figure 6A:
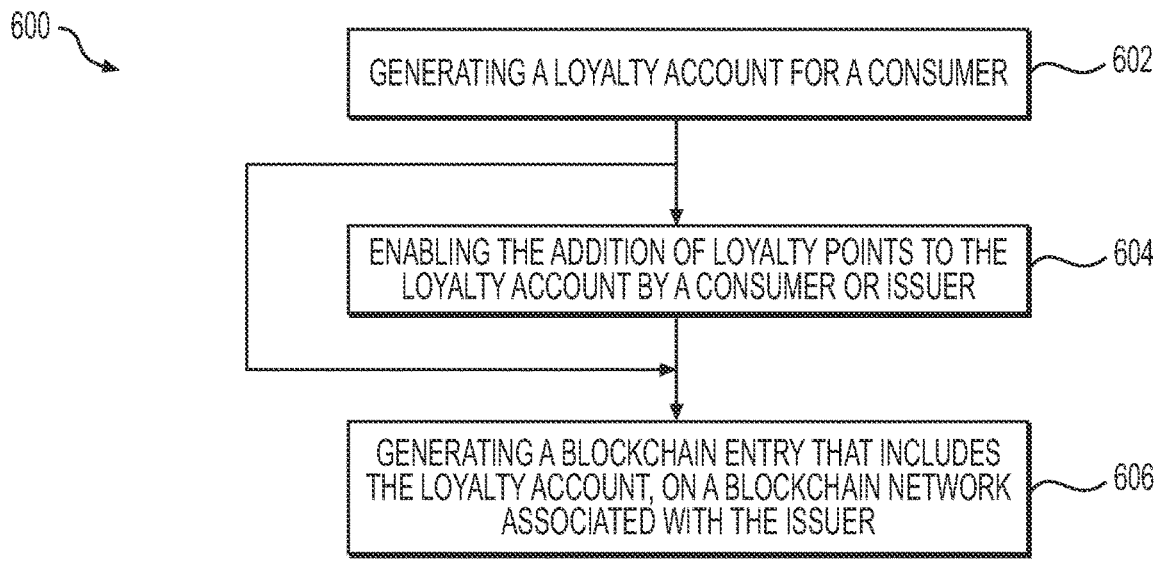
FIGS. 6A-6B depict block diagrams of a general method for establishing and/or adding points to a loyalty account using a distributed ledger, in accordance with a non-limiting embodiment.
Figure 6B:
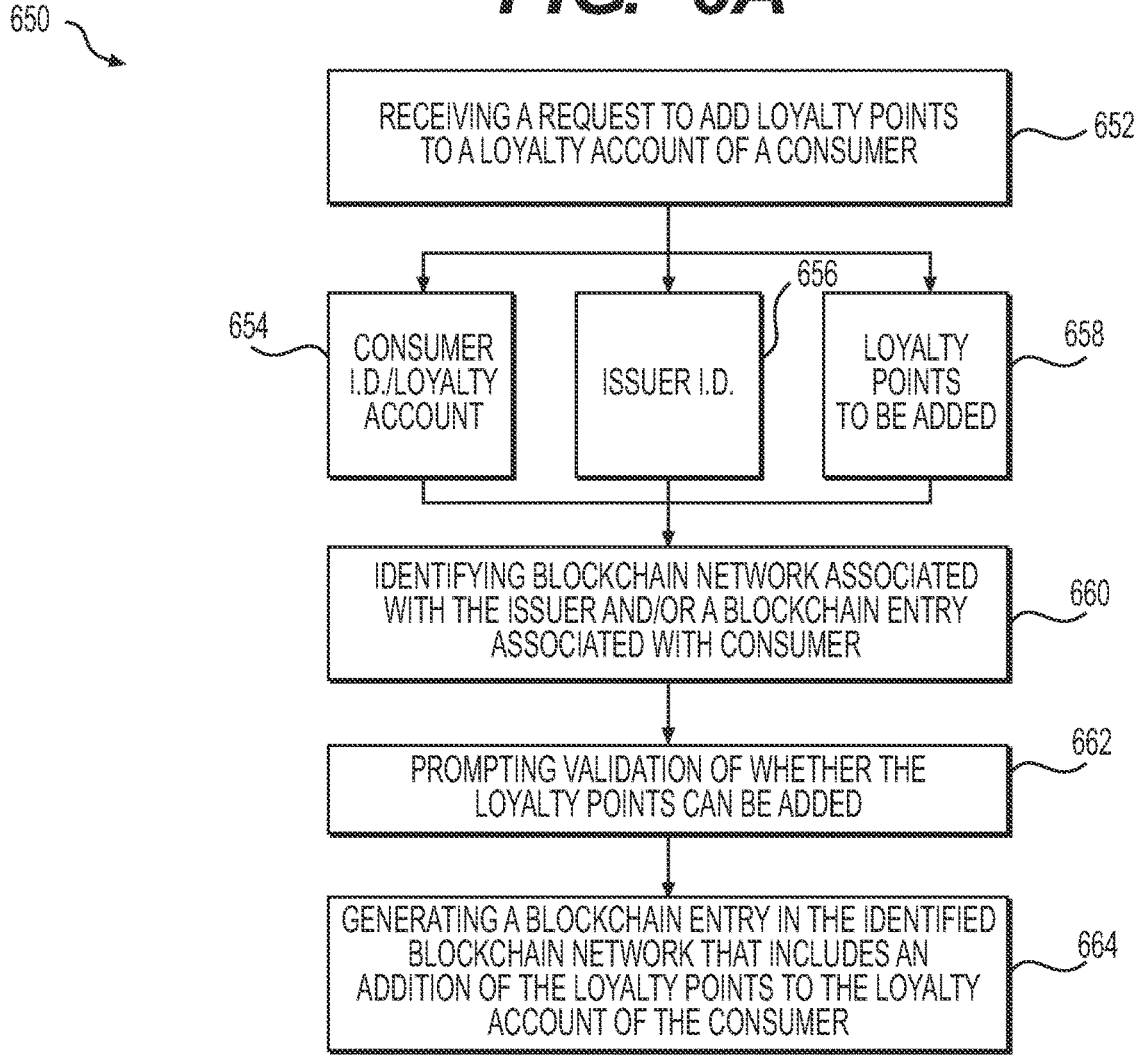

FIGS. 6A-6B depict block diagrams of general methods 600 and 650 for establishing and/or adding points to a loyalty account using distributed ledgers across an intermediary payment network, in accordance with a non-limiting embodiment.

Step 602 may include generating a loyalty account for a consumer. In some embodiments, step 602 may further include issuing a payment vehicle to the consumer by an issuer that has access to and/or manages the loyalty account of the consumer. The issued payment vehicle may have an identifier of the issuer ("issuer identification") and/or an identifier of the consumer ("consumer identification"), which may be read or retrieved at a point of sale (POS) system of a merchant by an appropriate party (e.g., an acquirer, debit network, payment network, financial institution, etc.). For example, the payment vehicle may be a physical or digital card with that includes the consumer and issuer identification, which can be used by another party to locate, identify, and/or access the loyalty account of the consumer In some embodiments, step 604 may include enabling the addition of loyalty points to the loyalty account by a consumer or issuer. For example, an issuer of the payment vehicle for the loyalty account may allow the consumer to add loyalty points by enabling the consumer to purchase loyalty points, e.g., via a corresponding amount in currency or cryptocurrency. Alternatively or additionally, a consumer may earn loyalty points from the issuer by purchasing goods or services at designated merchants. In some embodiments, a consumer may add loyalty points to one's loyalty account by transferring funds from a financial institution (e.g., purchasing loyalty points) to the issuer or loyalty account of the consumer, or transferring points from another loyalty account to the loyalty account of the consumer.

Step 606 may include generating an entry to a blockchain or its distributed ledger that includes the loyalty account on a blockchain network associated with the issuer. Furthermore, the issuer may be a node and/or a participant of the blockchain network.

FIG. 6B may describe at least one embodiment of a method 650 of adding loyalty points to a loyalty account of a consumer.

Thus, step 652 may include receiving a request to add loyalty points to a loyalty account of a consumer. The request may include an identification of a consumer, e.g., via the loyalty account of the consumer (consumer ID/loyalty account 654). The request may further include an identification of the issuer (e.g., issuer ID 656) and the count and/or value of the loyalty points requested to be added (e.g., loyalty points to be added 658). In some embodiments, a request may also be received for subtracting/deducting loyalty points, or converting loyalty points to or from another form of currency or cryptocurrency.

Step 660 may include identifying a blockchain network associated with the issuer and/or a blockchain entry associated with a consumer. In some embodiments, this blockchain network would have the issuer or consumer as a node and/or as a participant. Thus, an issuer identification or consumer identification may be used to identify the blockchain network.

Step 662 may include prompting a validation of whether the requested loyalty points can be added. In some embodiments, the validation may include determining whether the consumer has provided the sufficient consideration (e.g., in currency or cryptocurrency) for the purchase of the loyalty points. In other embodiments, the validation may involve determining whether a consumer purchased goods and/or services whose value in a currency or cryptocurrency can provide for the loyalty points to be added. In yet another embodiment, e.g., where loyalty program membership is restricted, the validation may include determining whether the merchant from which a consumer may have purchased a good or service is a qualifying merchant for the loyalty program. It is contemplated that the validation may be performed by validators, who may be other participants or nodes of the blockchain network. In some embodiments, methods 650 may be performed by one or more processors of a participant of the transaction (e.g., the acquirer), which may also function as an observer of the blockchain network. Blockchain validators and observers may expose standard hypertext transfer protocol (HTTP) based application program interfaces (APIs).

Step 664 may include generating a blockchain entry in the identified blockchain network that may include an addition of the loyalty points to the loyalty account of the consumer. The added loyalty points may be published to a shared or distributed ledger of the blockchain network, and may be accessible to the observer and/or participants of the blockchain network.

Figure 7:
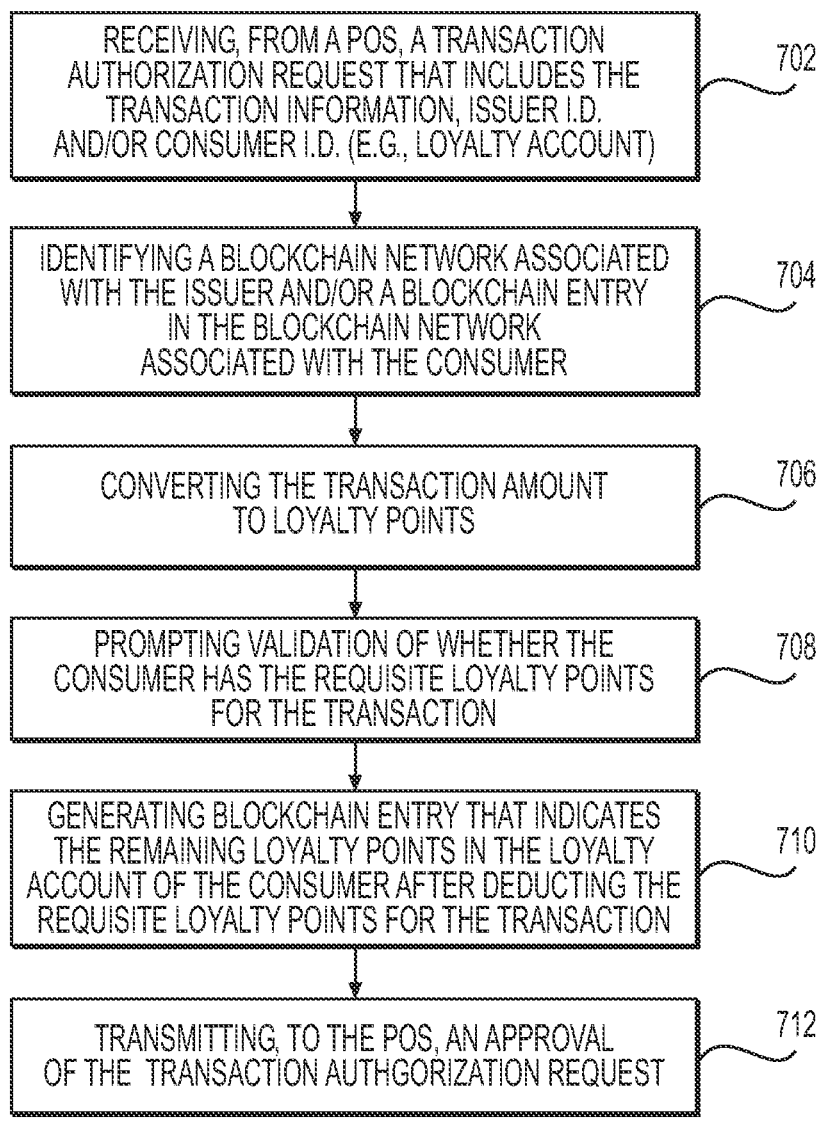
FIG. 7 depicts a block diagram of a general method for conducting payment processing with loyalty points using distributed ledger, in accordance with a non-limiting embodiment.

FIG. 7 depicts a block diagram of a general method 700 for conducting payment processing with loyalty points using distributed ledgers across an intermediary payment network, in accordance with a non-limiting embodiment. In some embodiments, method 700 may be performed by one or more processors of a transaction participant (e.g., a processor of an acquirer).

Thus, step 702 may include receiving, from a point of sale (POS) system, a transaction authorization request. The transaction authorization request may include transaction information (e.g., transaction amount, good/service transacted for, etc.), issuer identification, and/or consumer identification (e.g., the loyalty account of the consumer). The transaction authorization request may originate at a merchant for a good or service requested to be transacted by a consumer. In some embodiments, step 702 the reception of the transaction authorization request may involve intercepting the transaction authorization request. The transaction authorization request may include an indication that loyalty points, for example, were used by the consumer to make the purchase.

Step 704 may include identifying a blockchain network associated with the issuer and/or a blockchain entry in the blockchain network associated with the consumer. In some embodiments, this blockchain network would have the issuer or consumer as a node and/or as a participant. Thus, an issuer identification or consumer identification may be used to identify the blockchain network. Furthermore, step 704 may involve directing some or all of the transaction authorization request to the identified blockchain network, e.g., for further processing of the loyalty points based payment system.

Step 706 may include converting the transaction amount to loyalty points. It is contemplated that the transaction amount may be in a resource different from loyalty points (e.g., in a currency or cryptocurrency). In some embodiments, the conversion may be facilitated using a conversion table or formula stored in a node and/or blockchain entry of the identified blockchain network. The conversion table or formula may by dynamic, e.g., changing with the valuation of the loyalty points, currency, and/or cryptocurrency.

Step 708 may include prompting the validation of whether the consumer has the requisite loyalty points for the transaction. It is contemplated that the validation may be performed by validators, who may be other participants or nodes of the blockchain network. Blockchain validators and observers (e.g., acquirer) may expose standard hypertext transfer protocol (HTTP) based application program interfaces (APIs). The validation may involve a comparison of the converted transaction amount in loyalty points with the amount of loyalty points that the consumer currently has in the consumer's loyalty account.

In some embodiments, where a validation is successful, steps 710 and 712 may be performed. For example, step 710 may include generating a blockchain entry that indicates the remaining loyalty points in the loyalty account of the consumer after deducting the requisite loyalty points for the transaction. Step 712 may include transmitting, to the POS system, an approval of the transaction authorization request. In some embodiments, step 712 may further involve updating the loyalty points associated with the consumer identification in the issuer database upon the approval of transaction from the shared ledger, wherein the loyalty points at the issuer database are accessed by the consumer and the issuer using interactive graphical user interface (GUI).

If a validation (e.g., at 708) is not successful (e.g., if one or more of the participants of the blockchain network cannot validate that the consumer has the required loyalty points), a rejection message may be generated and/or sent indicating that the consumer does not have the required loyalty points for the transaction. The rejection message may be observed and/or received by an acquirer from the blockchain network. Alternatively or additionally, the rejection message may be sent to and/or displayed at the point of sale system of a merchant to deny the transaction. In some embodiments, the rejection message may also include the available amount in loyalty points in the loyalty card and/or an amount in currency equivalent to the available amount in loyalty points.

In some embodiments, the transmission to and receipt from the POS system may be performed wirelessly at a processor or computing system of the acquirer.

These and other embodiments of the systems and methods may be used as would be recognized by those skilled in the art. The above descriptions of various systems and methods are intended to illustrate specific examples and describe certain ways of making and using the systems disclosed and described here. These descriptions are neither intended to be nor should be taken as an exhaustive list of the possible ways in which these systems can be made and used. A number of modifications, including substitutions of systems between or among examples and variations among combinations can be made. Those modifications and variations should be apparent to those of ordinary skill in this area after having read this disclosure.

It is intended that the specification and examples be considered as exemplary only, with a true scope and spirit of the invention being indicated by the following claims.

What is claimed is:

1. A method for conducting payment processing, the method comprising:

determining a network node maintaining a distributed ledger, in a distributed ledger network, associated with one or more of an issuer or a consumer, according to an account identification of the one or more of the issuer or the consumer in a transaction authorization request;

generating a block in the distributed ledger based on the transaction authorization request;

initializing a smart contract of the distributed ledger network that maintains a list of agreed conversion rates between different loyalty points and currencies;

converting a transaction amount in the transaction authorization request, which is the block in the distributed ledger network, from an amount in a currency to an amount in loyalty points issued by a first merchant, according to a conversion formula retrieved from a distributed ledger entry of the smart contract of the distributed ledger network, wherein the conversion formula is dynamic and changes with a valuation of the loyalty points or currency; and prompting validators of the distributed ledger network to validate a transaction authorization request for a transaction with a second merchant by comparing the converted transaction amount in loyalty points issued by the first merchant with an amount of loyalty points present in a loyalty account issued by the first merchant to the consumer.

2. The method of claim 1, further comprising, if the validators of the distributed ledger network validate that the loyalty account of the consumer has the amount in loyalty points, generating a new immutable entry to the distributed ledger network, wherein the new immutable entry indicates remaining loyalty points in the loyalty account of the consumer after deducting the points required for the transaction; and sending a transaction approved message to a point of sale system at the second merchant.

3. The method of claim 2, further comprising:

updating the loyalty points associated with the consumer in an issuer database upon the approval of transaction from the distributed ledger network, wherein the loyalty points at the issuer database are accessible by the consumer using an interactive graphical user interface (GUI).

4. The method of claim 2, the method further comprising:

receiving the request to settle pending transactions, wherein the request comprises routing information associated with a financial institution;

identifying at least one of pending transaction for an issuer of the account in currency;

querying the distributed ledger network for, and receiving, information of the amount to be transferred for settlement between the issuer and the second merchant using conversion information available on a distributed ledger entry of the distributed ledger network; and transferring, funds to the second merchant's account using standard payment process for the pending transaction, wherein the second merchant's account information is obtained from the distributed ledger identified distributed ledger entry.

5. The method of claim 1, further comprising: if the validators of the distributed ledger network cannot validate that the loyalty account of the consumer has the amount in loyalty points, receiving a rejection message from the distributed ledger network; and sending the rejection message to a point of sale system to deny the transaction.

6. The method of claim 5, wherein the rejection message includes an available amount in loyalty points in the loyalty account and/or an amount in currency equivalent to the available amount in loyalty points to the point of sale system.

7. The method of claim 5, further comprising, displaying, by the point of sales system, an available amount in loyalty points in the loyalty account and/or an amount in currency equivalent to the available amount in loyalty points on an interactive graphical user interface (GUI).

8. A computer system for conducting payment processing, the computer system comprising:

a data storage device storing instructions using a distributed ledger; and one or more processors configured to execute the instructions to perform a method including:

determining a network node maintaining a distributed ledger, in a distributed ledger network, associated with one or more of an issuer or a consumer, according to an account identification of the one or more of the issuer or the consumer in a transaction authorization request;

generating a block in the distributed ledger based on the transaction authorization request;

initializing a smart contract of the distributed ledger network that maintains a list of agreed conversion rates between different loyalty points and currencies;

converting a transaction amount in the transaction authorization request, which is the block in the distributed ledger network, from an amount in a currency to an amount in loyalty points issued by a first merchant, according to a conversion formula retrieved from a distributed ledger entry of the smart contract of the distributed ledger network, wherein the conversion formula is dynamic and changes with a valuation of the loyalty points or currency; and prompting validators of the distributed ledger network to validate a transaction authorization request for a transaction with a second merchant by comparing the converted transaction amount in loyalty points issued by the first merchant with an amount of loyalty points present in a loyalty account issued by the first merchant to the consumer.

9. The computer system of claim 8, wherein an issuer of a payment vehicle for the transaction is a merchant providing at least one of goods and services.

10. The computer system of claim 8, wherein entries and/or nodes of the distributed ledger network further include at least one of a header and a conversion table.

11. The computer system of claim 8, wherein the one or more processors is an observer of the distributed ledger network.

12. The computer system of claim 11, wherein the distributed ledger validators and observers expose standard hypertext transfer protocol (HTTP) based application program interfaces (APIs).

13. The computer system of claim 8, wherein the distributed ledger network comprises a shared ledger that is shared between network nodes associated with different issuers participating in a loyalty program.

14. The computer system of claim 8, wherein the one or more processors are further configured for, if the validators of the distributed ledger network validate that the loyalty account of the consumer has the amount in loyalty points:

generating a new immutable entry to the distributed ledger network, wherein the new immutable entry indicates remaining loyalty points in the loyalty account of the consumer after deducting the points required for the transaction; and sending a transaction approved message to a point of sale system at the second merchant.

15. The computer system of claim 14, wherein the one or more processors are further configured for:

receiving the request to settle pending transactions, wherein the request comprises routing information associated with a financial institution;

identifying at least one of pending transaction for an issuer of the account in currency;

querying the distributed ledger network for, and receiving, information of the amount to be transferred for settlement between the issuer and the second merchant using conversion information available on a distributed ledger entry of the distributed ledger network; and transferring, funds to the second merchant's account using standard payment process for the pending transaction, wherein the second merchant's account information is obtained from the distributed ledger identified distributed ledger entry.

16. The system of claim 8, wherein the one or more processors is further configured for, if the validators of the distributed ledger network cannot validate that the loyalty account of the consumer has the amount in loyalty points:

receiving a rejection message from the distributed ledger network; and sending the rejection message to a point of sale system to deny the transaction.

17. A non-transitory machine readable medium storing instructions that, when executed by one or more processors, cause the one or more processors to perform a method for conducting payment processing, the method including:
- determining a network node maintaining a distributed ledger, in a distributed ledger network, associated with one or more of an issuer or a consumer, according to an account identification of the one or more of the issuer or the consumer in a transaction authorization request;
- generating a block in the distributed ledger based on the transaction authorization request;
- initializing a smart contract of the distributed ledger network that maintains a list of agreed conversion rates between different loyalty points and currencies;
- converting a transaction amount in the transaction authorization request, which is the block in the distributed ledger network, from an amount in a currency to an amount in loyalty points issued by a first merchant, according to a conversion formula retrieved from a distributed ledger entry of the smart contract of the distributed ledger network, wherein the conversion formula is dynamic and changes with a valuation of the loyalty points or currency; and
- prompting validators of the distributed ledger network to validate a transaction authorization request for a transaction with a second merchant by comparing the converted transaction amount in loyalty points issued by the first merchant with an amount of loyalty points present in a loyalty account issued by the first merchant to the consumer.

18. The non-transitory machine readable medium of claim 17, the method further comprising, if the validators of the distributed ledger network validate that the loyalty account of the consumer has the amount in loyalty points,
- generating a new immutable entry to the distributed ledger network, wherein the new immutable entry indicates remaining loyalty points in the loyalty account of the consumer after deducting the points required for the transaction; and
- sending a transaction approved message to a point of sale system at the second merchant.

19. The non-transitory machine readable medium of claim 17, the method further comprising: if the validators of the distributed ledger network cannot validate that the loyalty account of the consumer has the amount in loyalty points,
- receiving a rejection message from the distributed ledger network; and
- sending the rejection message to a point of sale system to deny the transaction.

20. The non-transitory machine readable medium of claim 19, wherein the rejection message includes an available amount in loyalty points in the loyalty account and/or an amount in currency equivalent to the available amount in loyalty points to the point of sale system.

* * * * *